United States Patent
Engesser (10) Patent No.: US 6,805,661 B2
(45) Date of Patent: Oct. 19, 2004

(54) METHOD AND INSTALLATION FOR FOLDING A TEXTILE STRIP LENGTH, IN PARTICULAR A STRIP LENGTH FOR A LABEL

(75) Inventor: Bernhard Engesser, Gossau (CH)

(73) Assignee: Textilma AG (CH)

( * ) Notice: Subject to any disclaimer, the term of this patent is extended or adjusted under 35 U.S.C. 154(b) by 0 days.

(21) Appl. No.: 10/220,971

(22) PCT Filed: Jan. 19, 2001

(86) PCT No.: PCT/CH01/00041
§ 371 (c)(1),
(2), (4) Date: Sep. 6, 2002

(87) PCT Pub. No.: WO01/66343
PCT Pub. Date: Sep. 13, 2001

(65) Prior Publication Data
US 2003/0017929 A1 Jan. 23, 2003

(30) Foreign Application Priority Data
Mar. 7, 2000 (CH) .............................................. 440/00

(51) Int. Cl.[7] .............................................. B31B 1/52
(52) U.S. Cl. ...................... 493/457; 493/961; 493/357; 493/416
(58) Field of Search ................................ 493/416, 423, 493/961, 70, 457, 357, 153

(56) References Cited
U.S. PATENT DOCUMENTS 1,211,489 A * 1/1917 Petrocchi .................... 493/353
1,283,056 A * 10/1918 Bignell ........................ 493/353
2,069,115 A * 1/1937 Rosenthal ................... 493/341
2,144,084 A * 1/1939 Rosenthal ................... 493/357
2,158,144 A * 5/1939 Oskow ........................ 493/341
2,680,612 A * 6/1954 Hubelmeyer ................. 493/34
2,778,633 A * 1/1957 Ross .......................... 493/357
3,148,874 A 9/1964 Forthmann

FOREIGN PATENT DOCUMENTS

IT            12 68 836       3/1997

* cited by examiner

Primary Examiner—Stephen F. Gerrity
Assistant Examiner—Michelle Lopez
(74) Attorney, Agent, or Firm—Ostrolenk, Faber, Gerb & Soffen, LLP (57) ABSTRACT

A method for folding a textile strip length, including the steps of first holding the strip length firmly close to an auxiliary folding edge whose direction is parallel to a definitive folding edge, folding a part of the strip around the auxiliary folding edge substantially perpendicular to the plane of the strip length to form a definitive fold, gripping an end of the part of the strip folded around the auxiliary folding edge, compressing the part of the strip against a clamping surface arranged substantially co-planar with the plane of the strip length and belonging to a clamping element forming the definitive fold, and smoothing and fixing the folded part of the strip lying substantially in the plane of the strip length between the clamping surfaces arranged substantially in the plane of the strip length.

25 Claims, 8 Drawing Sheets

METHOD AND INSTALLATION FOR FOLDING A TEXTILE STRIP LENGTH, IN PARTICULAR A STRIP LENGTH FOR A LABEL

This is a U.S. national stage of application No. PCT/CH01/00041, filed on Jan. 19, 2001. Priority is claimed on that application and on the following applications: Country: Switzerland, Application No.: 440/00, Filed: Mar. 7, 2000.

BACKGROUND OF THE INVENTION

The invention relates to a method for folding a textile strip length, in particular a strip length for a label and to an installation for carrying out the method.

PRIOR ART

Methods and installations of the type mentioned at the beginning are known, for example from IT-1 268 836 B. In the method described there and the installation for carrying it out, a strip length is first held firmly close to an auxiliary folding edge which is to be formed and whose direction is parallel to the definitive folding edge. The part of the strip which projects reaches over a gap formed by two clamping elements, the clamping surfaces of which being aligned perpendicular to the plane of the strip lengths. A flat blade pushes this part of the strip into the gap, forming a fold, and then has to be withdrawn again before the fold formed can be smoothed and fixed by pressing the clamping surfaces against each other. Here, the problem arises that when the blade is pulled out, the fold formed is easily changed or even destroyed. Even when the fold is smoothed and fixed properly, there is the further disadvantage that this fold around the auxiliary folding edge is aligned perpendicular to the plane of the strip. By means of the smoothing and fixing operation, this auxiliary fold is also firstly fixed, so that in the finally folded strip length the folded parts of the strip project at right angles to the plane of the strip lengths, which is undesired and as a rule makes post-processing of the folded strip lengths necessary.

U.S. Pat. No. 3,148,874 A discloses another method and another installation for folding a textile strip length, the strip length firstly being held firmly by means of an L-shaped holding element beside a folding edge to be formed. The projecting part of the strip is firstly folded by means of a folding element at right angles to the plane of the strip length and then turned over a holding foot of the L-shaped holding element, parallel to the plane of the strip length. The holding foot of the L-shaped holding element then has to be withdrawn again before the fold formed is smoothed and fixed by pressing clamping surfaces, which are aligned parallel to the strip length, against each other. Although the fold formed already lies in the plane of the strip length, the problem also results here that when the holding foot is withdrawn, the fold formed can easily be changed or even destroyed.

SUMMARY OF THE INVENTION

It is the object of the invention to improve a method and an installation for folding a textile strip length, in particular a strip length for a label, in such a way that the aforementioned disadvantages no longer occur.

a) a method as claimed in claim 1; and b) an installation for carrying it out as claimed in claim 2.

Pursuant to this object, and others which will become apparent hereafter, one aspect of the present invention resides in a method for folding a textile strip length by first holding the strip length firmly close to an auxiliary folding edge whose direction is parallel to a definitive folding edge, folding a part of the strip around the auxiliary folding edge substantially perpendicular to the plane of the strip length to form a definitive fold, gripping an end of the part of the strip folded around the auxiliary folding edge, compressing the part of the strip against a clamping surface arranged substantially co-planar with the plane of the strip length and belonging to a clamping element forming the definitive fold, and smoothing and fixing the folded part of the strip line substantially in the plane of the strip length between the clamping surfaces arranged substantially in the plane of a strip length.

The fact that the strip part angled over around an auxiliary folding edge is gripped and compressed and therefore folded against a clamping surface which is aligned substantially coplanar with the plane of the strip section results in two critical advantages. Since, during the compression, the compression tool does not engage in the fold or a gap between the clamping elements, it can remain in use until the clamping surfaces have gripped and fixed the folds, so that exact alignment and shaping of the folds is always provided, and slipping is undoubtedly prevented. Furthermore, the clamping surfaces rise substantially in the plane of the strip length, so that the folded, smoothed and fixed folds of the strip length likewise lie in the plane of the strip length and the auxiliary folded edge is eliminated, so that a satisfactory, flat, folded strip length is produced and post-treatment is no longer necessary.

In order to carry out the method, various installations are conceivable. For example, it is possible for support elements, on which strip sections rest for processing, to be arranged at rest and for folding and clamping tools to be moved against the resting support die. A particularly advantageous installation for folding the textile strip length includes a support element for the strip length to be folded, which support element has a support surface aligned parallel to the strip length and an auxiliary folding edge aligned parallel to a folding edge to be created. The installation further has a holding element arranged to cooperate with the support surface of the support element for the strip length. A folding element is provided for forming a fold of the strip length between clamping surfaces of two clamping elements for smoothing and fixing the fold. The clamping surfaces of the clamping elements are aligned substantially co-planar with a plane of the strip length to be folded. The auxiliary folding edge has a supporting surface aligned substantially perpendicular to the support surface of the support element. The folding element has a compression edge arranged to cooperate with the supporting surface of the auxiliary folding edge so as to grip an end of the part of the strip to be turned over against the supporting surface into a compressed part of the strip against the clamping surface of one of the clamping elements to form the definitive fold.

For the folding of the part of the strip projecting beyond the support surface of the support element, various possibilities result. For example, the support element can be arranged at rest and the holding element, which can be biased, can be biased against the support surface. An appropriate folding element can then be moved along the support element in order to turn over the projecting part of the strip against the supporting surface. By contrast, in a particularly preferred solution the support element together with the holding element that can biased against the support surface are movable into and out of a holding position for the strip length.

In addition, diverse possibilities result for the configurations of the folding element. For example, a spatula can be moved over the auxiliary folding edge of the support element and along the supporting surface in order to turn the projecting part of the strip over against the supporting surface. However, in a particularly advantageous embodiment the folding element has an oblique run-on surface which, during a relative movement between support element and folding element, turns over a part of the strip which projects beyond the support surface around the auxiliary folding edge and against the supporting surface. In order to permit reliable turnover, the support element and the folding element are biased toward each other.

It is particularly expedient if the folding element is also designed as a clamping element, against which the other clamping element is biased. This biasing can be produced by various means, for example by electromagnetic or fluid-actuated means. However, biasing by means of a spring is particularly advantageous. This also makes it easier to raise the clamping element by means of the support element, which can be moved in relation thereto.

The holding element can be biased against the support element by a bias spring and can be moved by the support element into an initial position in which the holding element is latched by a releasable latch. In one embodiment, the holding element is set back with respect to the auxiliary folding edge of the support surface of the support element, and the support surface cooperates with the clamping element arranged to project beyond the folding element by means of the auxiliary folding edge so as to raise the clamping element off the folding element as the support element is moved out.

In a further embodiment of the invention, at least one of the clamping elements is provided with a heating element.

In another embodiment of the invention a folding station, a conveying device and an unloading station are provided. The support element and the holding element are arranged in a stationary manner on the folding station and the folding element with the clamping element is arranged on the conveying device which can be moved from the folding station to the unloading station. This construction permits a continuous operation of the installation. The conveying device can be provided with a plurality of folding elements and clamping elements distributed over its length. In order to drive the conveying device, an extremely wide range of materials can be used, for example a stepping motor, a standard motor with limit-switch control, a Maltese-cross drive or the like.

In principle, it is possible to construct the installation in such a way that a strip length is provided with a fold only at one end. In the case of labels, however, two folds are desired at the two ends. This two-fold operation can be accomplished using two tool sets wherein one tool set is a mirror image of the other tool set. In order to be able to set the installation to strip lengths of different lengths, one set of tools is arranged such that it can be displaced relative to the other set, in order to be able to set the mutual spacing to the desired length of the strip lengths.

The installation expediently has a delivery device for the strip lengths to the support element. Such a delivery device is advantageously configured in order to supply a continuous strip, from which strip lengths are severed at an appropriate severing device. According to a further embodiment, the feed device can be equipped with a conveying element, in which the lengths of the strip lengths to be severed can be set. An installation which is particularly capable of adaptation results if the severing device has both a mechanical cutting device and a thermal cutting device, for example an infrared or ultrasonic cutting device, which can be used as desired.

The installation in another embodiment is expediently equipped with a stacking device for the folded strip lengths, it having proven to be advantageous to provide a magazine, in which the folded strip lengths can be moved against a displacement resistance and can be held.

It is also advantageous that both the method and the installation are suitable for an extremely wide range of folds, for example, not just for the production of strip lengths with one or two end folds but also for producing strip lengths with a center fold. Even the production of strip lengths with a diagonal fold is conceivable. This is possible since folding is carried out merely by means of a compression operation against a flat clamping surface which, moreover, is aligned substantially in or parallel to the plane of the strip lengths, so that folding can be carried out at any desired point on the strip length and with any desired alignment of the auxiliary folding edge. This makes it possible to use only simple tools which, on one and the same installation, can also readily be replaced.

BRIEF DESCRIPTION OF THE DRAWINGS

Exemplary embodiments of the invention will be described in more detail below using schematic drawings, in which.

DESCRIPTION OF THE PREFERRED EMBODIMENTS

Figure 1:
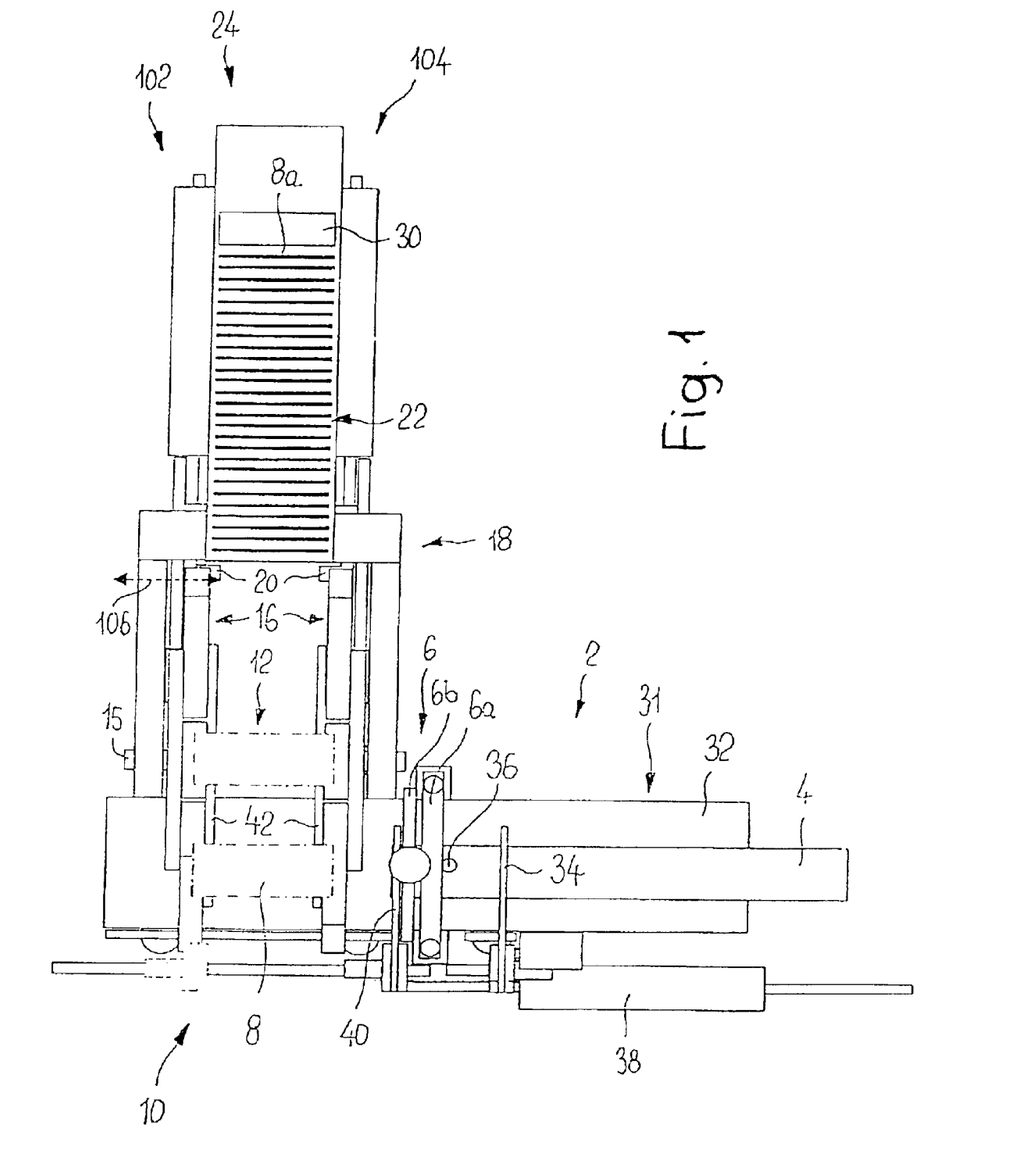
FIG. 1 shows an installation for folding a textile strip length, in particular a strip length for a label in plan view.
Figure 2:
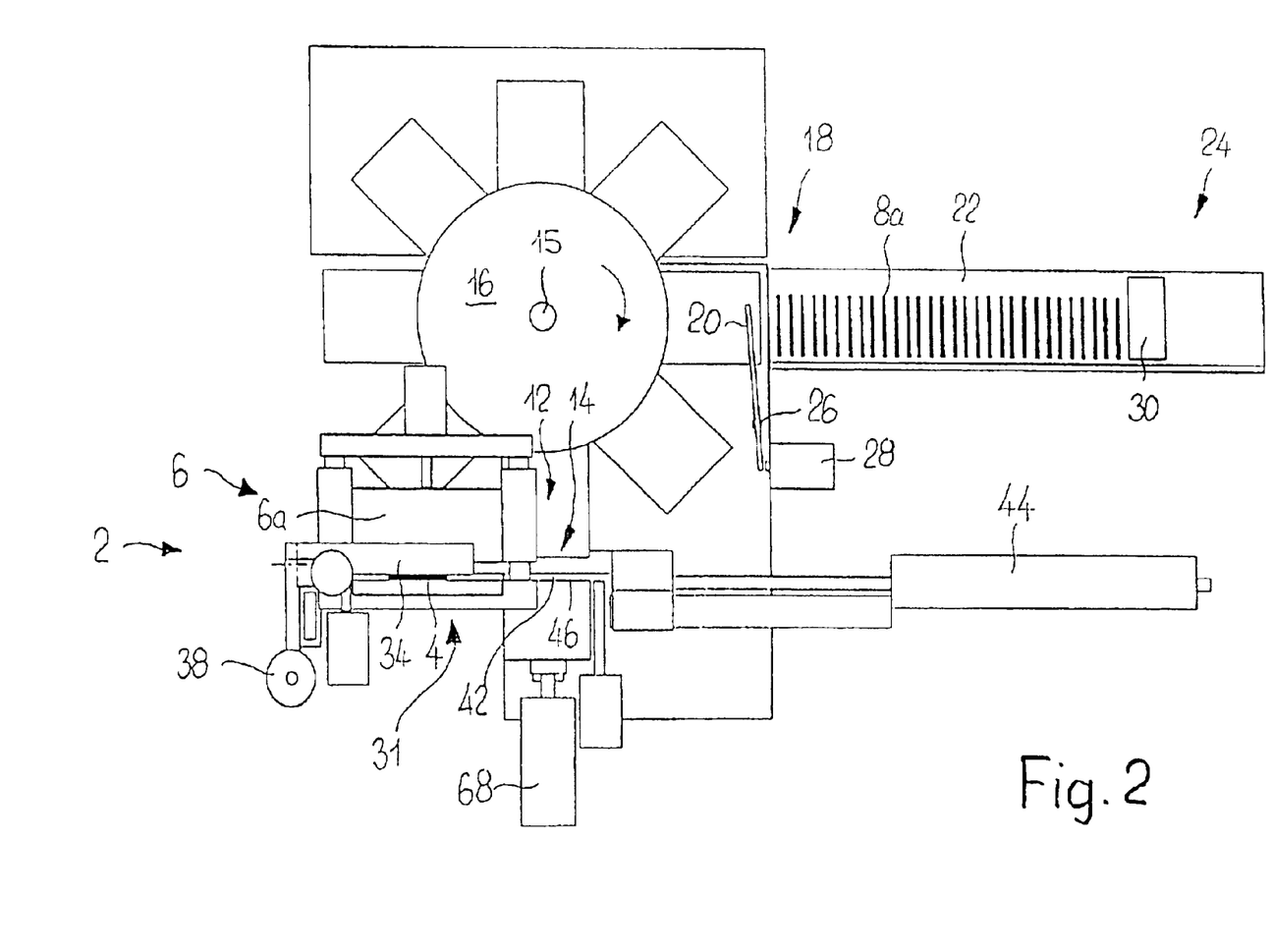
FIG. 2 shows the installation of FIG. 1 in side view.

FIGS. 1 and 2 show a schematic representation of an installation for folding a textile strip length, in particular a strip length for a label. The installation includes a delivery device 2, at which strip lengths 8 are severed from an endless strip 4 by means of a severing device 6 and are fed to a folding station 12 by means of a transfer device 10. At the folding station 12, the strip lengths 8 are folded at the ends and the folded strip lengths 8a are held firmly on clamping tools 14 of a carousel-like conveying device 16, which is rotatably mounted over a shaft 15. The folded strip lengths 8a are thus conveyed onward from the folding station 12 to an unloading station 18, where they are transferred by means of lever arms 20 to a magazine 22 of a stacking device 24. The lever arms 20, which are mounted such that they can rotate about a pivot 26, are actuated by means of an actuator 28 and discharge the folded strip lengths 8a to the magazine 22 against a displacement resistance 30.

The delivery device 2 contains a feed device 31 with a feed table 32, on which an endless strip 4 from a supply roll, not specifically illustrated, is fed by means of a conveying element 34 to the severing device 6 in the desired length of the strip length. The conveying element 34 can be, for example, a conveying arm moving back and forth or a driven conveying roll. The strip length to be conveyed is to be determined by a sensor 36, which responds to strip marks on the strip 4 supplied. In addition, inspection means (not specifically illustrated) for determining strip faults can also be associated with the feed table 32. The severing device 6 contains a thermal cuffing device 6a, for example an infrared or ultrasonic cutting device 6a, and a mechanical cutting device 6b, which can come into use as desired, depending on the material characteristics of the strip to be treated. The transfer device 10 between the severing device 6 and the folding station 12 has firstly, after the severing device 6, a conveying arm 40 which is driven in oscillation by means of a drive 38, for example a fluid-actuated piston/cylinder unit, which arm transfers the strip length 8 from the severing device 6 to a rail 42. The latter is driven back and forth by means of an oscillating drive 44 in order to feed the strip length to the folding station, as emerges from FIG. 4a.

Figure 3A:
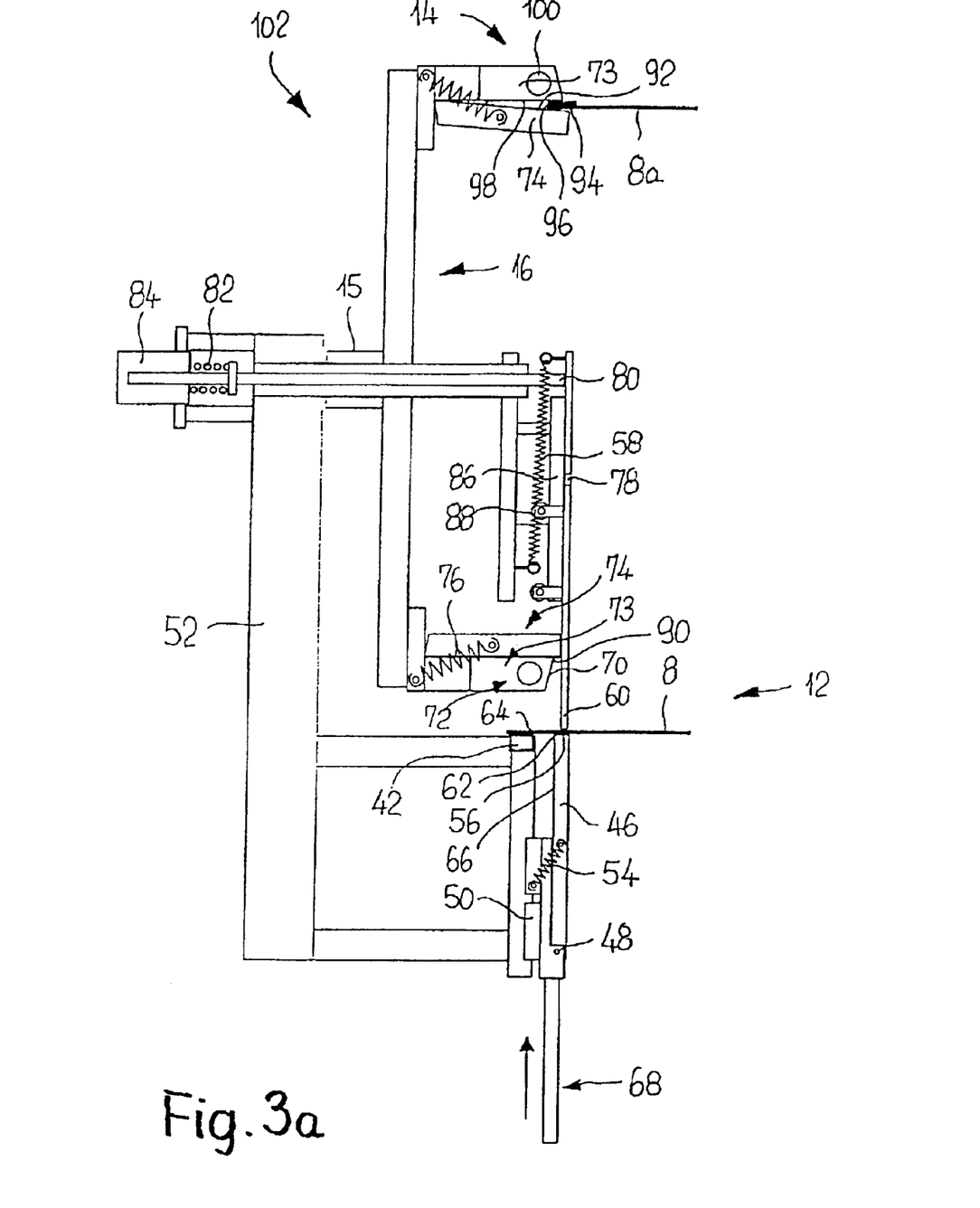
FIGS. 3a to 3c show the folding station of the installation according to FIG. 1 in detail, in longitudinal section and in various operating positions.
Figure 3B:
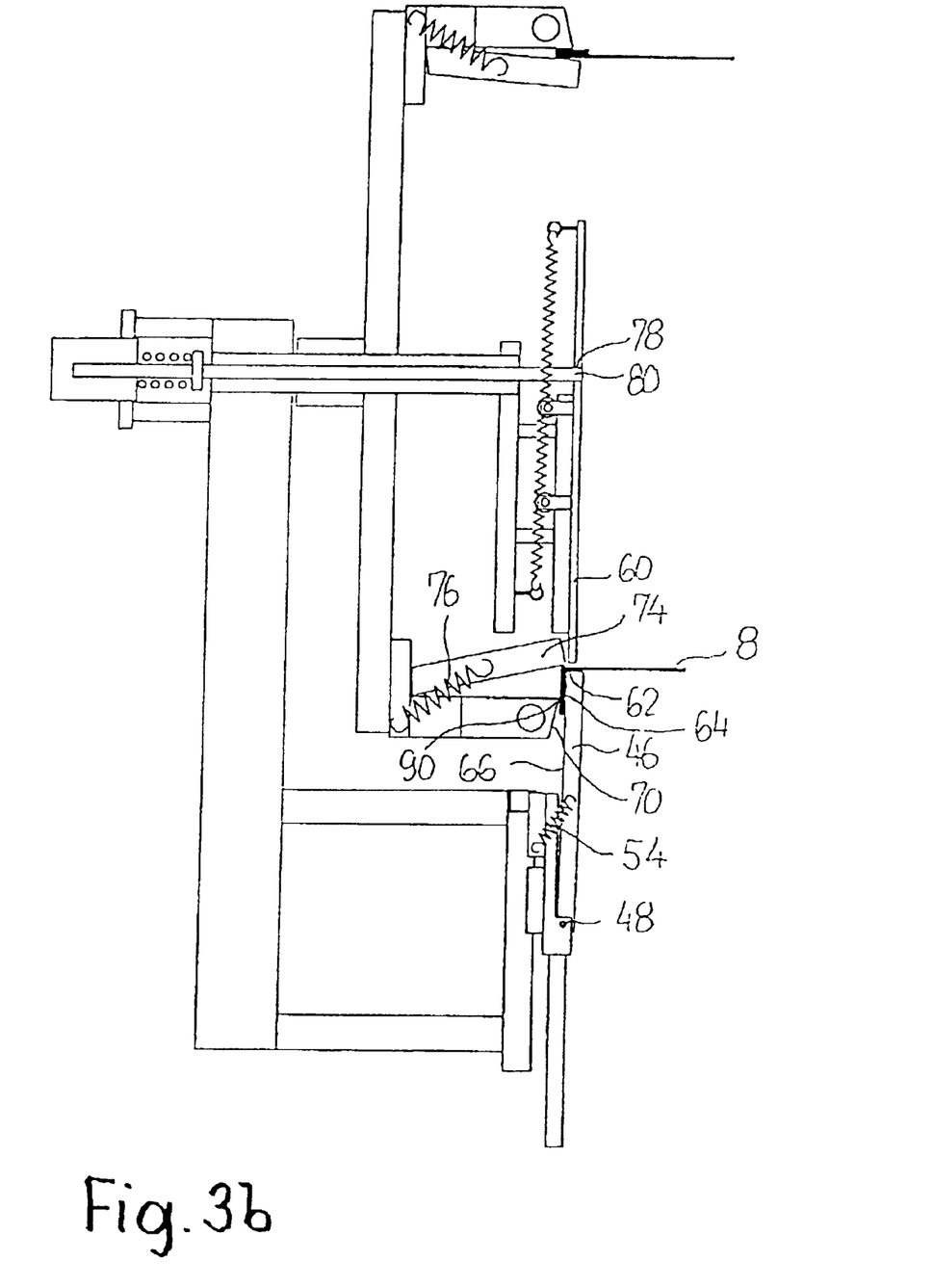
Figure 3C:
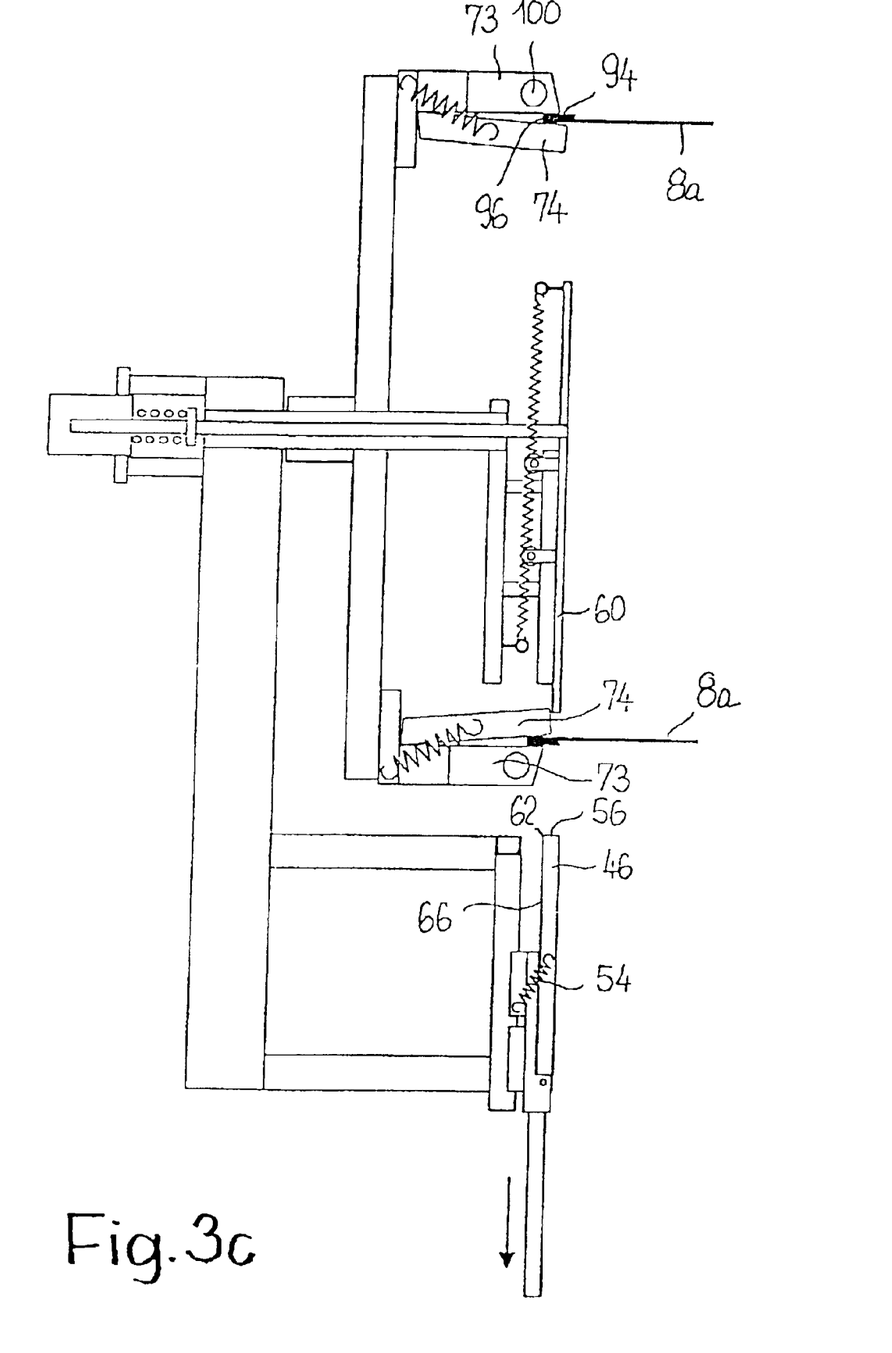
Figure 4A:
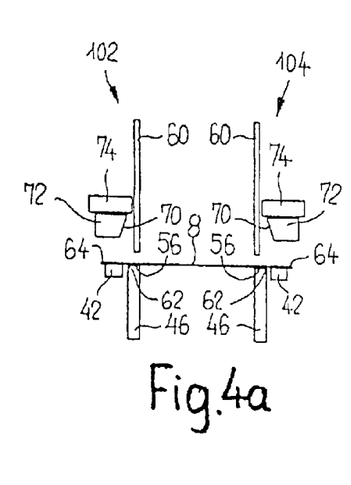
FIGS. 4a to 4h show the principle of the folding at the folding station according to a schematic representation and in various intermediate stages from the insertion of a strip length until the deposition of the folded strip length.
Figure 4B:
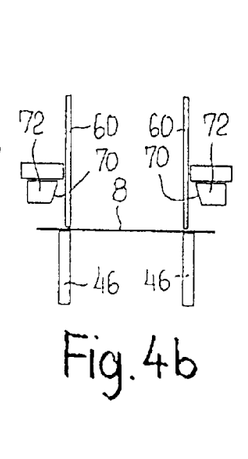
Figure 4C:
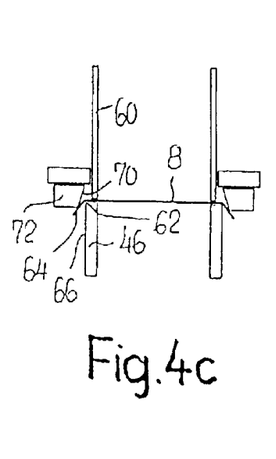
Figure 4D:
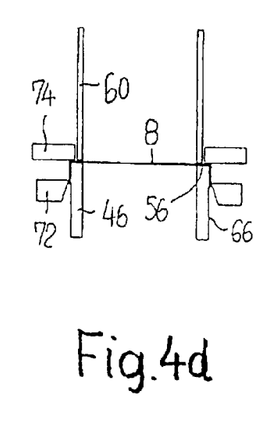

One half of the folding station is illustrated schematically in FIGS. 3a to 3c. A second half, which is of identical construction, exists as a mirror image of this, as emerges from 4a to 4h. The folding station 12 contains a support element 46, which is arranged on a carriage 50 such that it can be pivoted about an axis of rotation 48, said carriage 50 being mounted in the machine frame 52 such that it can be moved up and down. A bias spring 54 biases the support element 46 into the vertical basic position. On the upper side, the support element 46 contains a support surface 56, to which the strip length 8 to be treated is transferred by means of the rail 42 and deposited (FIG. 4a). A holding element 60 biased against the support surface 46 by means of a spring 58 holds the strip length 8 firmly on the support element 46 (FIG. 4b). The support element 46 also has an auxiliary folding edge 62, which is aligned parallel to the folding edge (96 in FIG. 4g) of the fold to be produced (94 in FIG. 4g) and around which the part 64 of the strip projecting beyond the support surface can be folded against a supporting surface 66 adjoining the auxiliary folding edge 62 (FIGS. 4c and 4d). The supporting surface 66 is aligned substantially perpendicular to the support surface 56. The support element 46 can be moved by means of a drive 68 shown in FIG. 2, for example a fluid-operated piston/cylinder unit, from the basic position shown in FIGS. 3a and 4b into the folding position shown in FIGS. 3b and 4d. In the process, the support element 46 comes into contact with the inclined run-on surface 70 of a folding element 72, which turns over the part 64 of the strip against the supporting surface 66 (FIGS. 3b, 4c and 4d). At the same time, a clamping element 74 is raised, which is arranged above the folding element 72 such that it can be pivoted and is biased by means of a spring 76 against the folding element 72 which, at the same time, is also designed as a clamping element 73. Tn order to permit the clamping element 74 to be raised, the holding element 60 is set back with respect to the auxiliary folding edge 62 of the support element 46, so that the support element 46 can interact with the clamping element 74 projecting beyond the folding element 72 or clamping element 73.

In the folding position shown in FIG. 3b, the holding element 60 latches by means of an opening 78 onto a latching pin 80, which is biased into this latching position by means of a spring 82. The latching pin 80 can be pulled back from the locking position by means of an actuator 84. The holding element 60 is guided such that it can be displaced on a rail 86 by rollers 88, the rail 86 being connected in a fixed position to the machine frame 52.

Figure 4E:
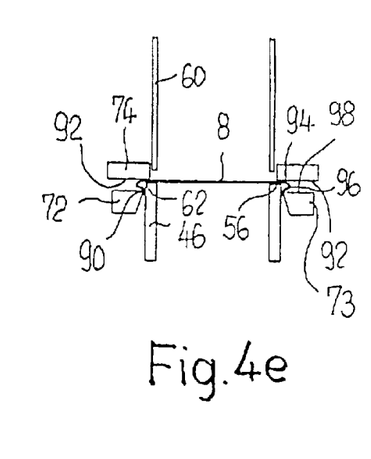
Figure 4F:
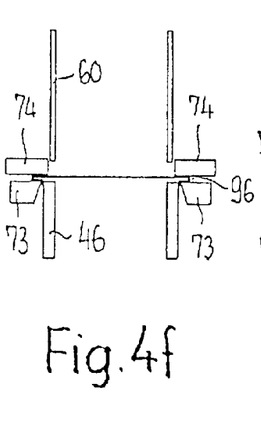
Figure 4G:
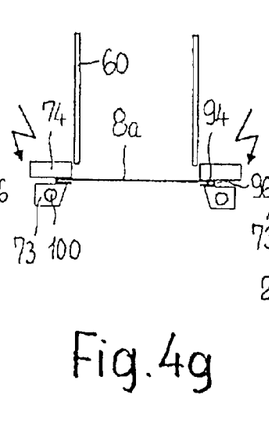
Figure 4H:
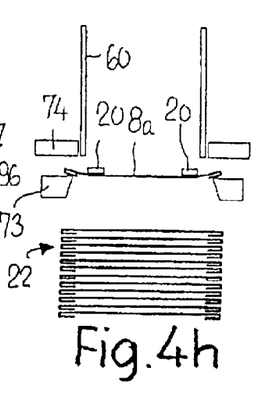

The definitive formation of a fold is carried out in accordance with FIGS. 4d to 4f, as follows. The folding edge 72 has a compression edge 90 which, as FIG. 4d reveals, co-operates with the end of the part 64 of the strip turned over against the supporting surface 66, the supporting surface 66 biased against the folding element 72 by means of the bias spring 54 reinforcing the engagement between the compression edge 90 and the part 64 of the strip. The support element 46 is then pulled back into the initial position, the compression edge 90 of the folding element 72 compressing the projecting part 64 of the strip against the clamping surface 92 of the clamping element 74 and, in the process, forming the definitive fold 94 with the folding edge 96, which lies in the plane of the strip length 8a, as revealed by FIGS. 4e and 4f. In the process, the fold 94 is clamped in between the clamping surfaces 92 of the clamping element 74 and the clamping surface 98 of the folding element 72, which at the same time is also designed as a clamping element 73, said elements being aligned coplanar with the plane of the strip length (FIGS. 4e and 4f). The clamping element 73 contains a heating element 100, in order to smooth the fold 94 clamped in between the clamping surfaces 92, 98 and to fix it in the turned-over form (FIG. 4g). Smoothing and fixing are carried out during the conveying movement of the carousel-like conveying device 16 from the folding station 12 to the unloading station 18 (FIGS. 4f to 4h). There, the folded strip length 8a is transferred into the magazine 22 of, the stacking device 24 by means of the lever arms 20 with the clamping elements 73, 74 open.

In order to be able to set the installation to tape lengths of different lengths, the installation, as already mentioned, is constructed from two halves 102, 104, which can be displaced relative to each other, as indicated by the displacement arrow 106 in FIG. 1.

Figure 5:
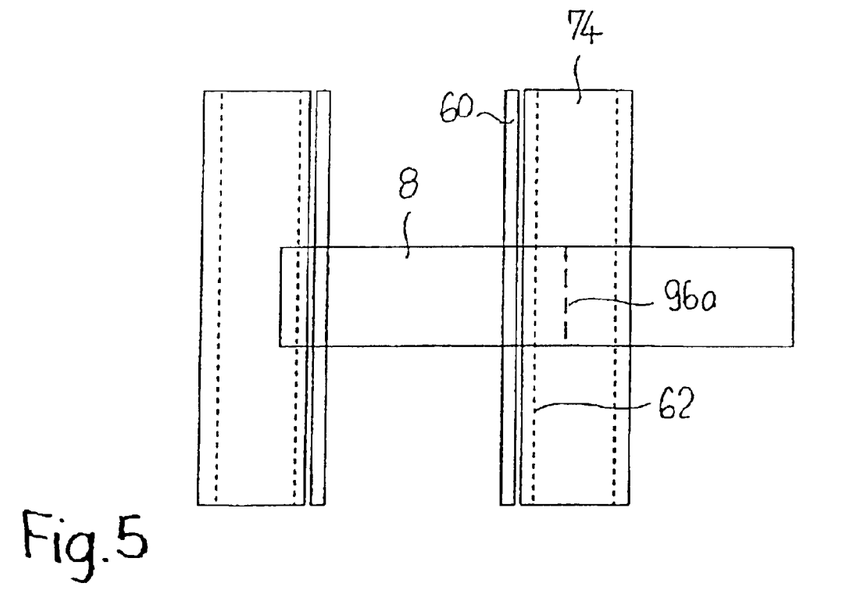
FIG. 5 shows an outline of the folding station for producing a strip length with center fold.
Figure 6:
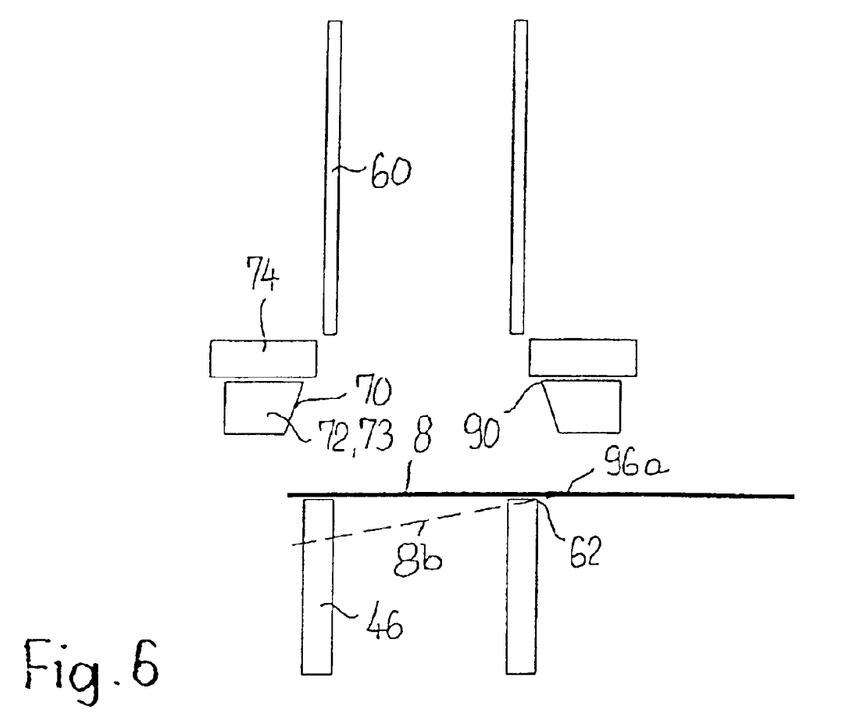
FIG. 6 shows the folding station according to FIG. 5 in longitudinal section.

FIGS. 5 and 6 show the use of the installation for producing a label with a center fold. For this purpose, the strip length 8 is placed on the support elements 46, 46 in such a way that the strip length 8 rests with about half its length on the auxiliary folding edge 62. The folding operation can then be carried out as hitherto, the folding edge 96a of the center fold being located at half the length of the strip lengths.

Figure 7:
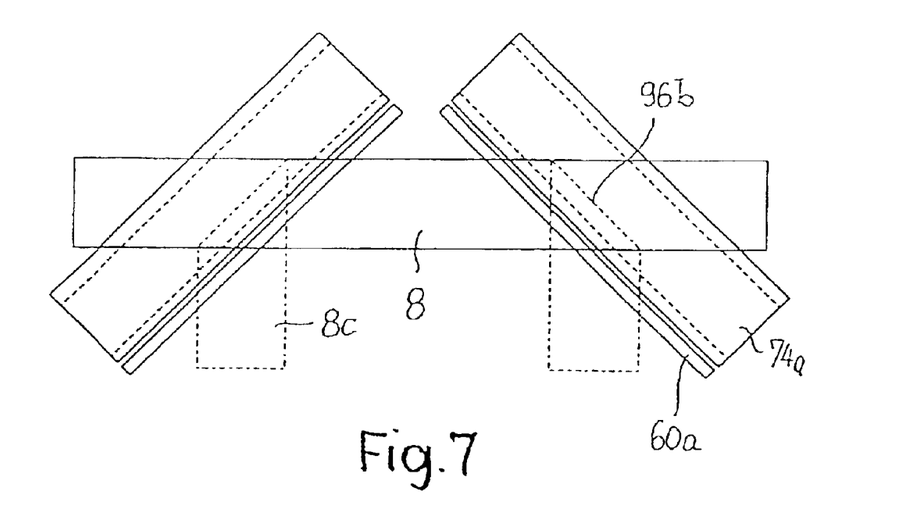
FIG. 7 shows an outline of the folding station for producing a strip length with diagonal fold.
Figure 8:
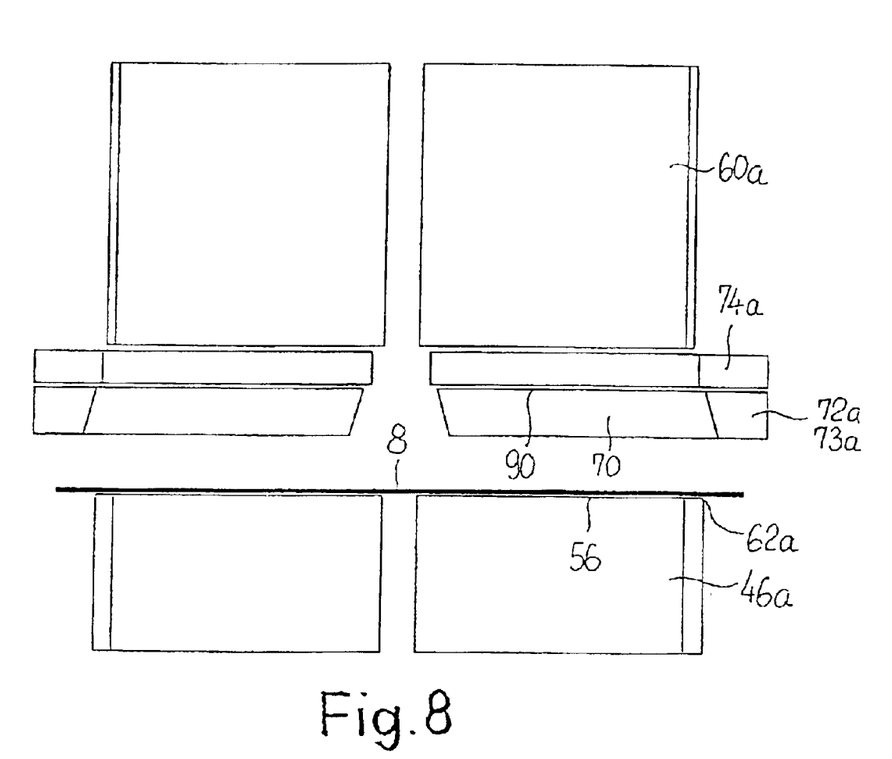
FIG. 8 shows the folding station of FIG. 7 in longitudinal section.

FIGS. 7 and 8 show the modification of the installation for producing strip lengths with diagonal folding. To this end, the tools, that is to say the support elements 46a with the auxiliary folding edges 62a, the holding elements 60a, the folding elements 72a and the clamping elements 73a, 74a are aligned parallel to the diagonal folding edges 96b to be produced. The folding operation is then likewise carried out again in a manner analogous to FIGS. 4a to 4h.

LIST OF DESIGNATIONS

| | |
|---|---|
| 2 | Delivery device |
| 4 | Strip |
| 6 | Severing device |
| 6a | Thermal cutting device |
| 6b | Mechanical cutting device |
| 8 | Strip length |
| 8a | Folded strip length |
| 8b | Folded strip length |
| 8c | Folded strip length |
| 10 | Transfer device |
| 12 | Folding station |
| 14 | Clamping tool |
| 15 | Shaft |
| 16 | Carousel-like conveying device |
| 18 | Unloading station |
| 20 | Lever arm |
| 22 | Magazine |
| 24 | Stacking device |
| 26 | Pivot |
| 28 | Actuator |
| 30 | Displacement resistance |
| 31 | Feed device |
| 32 | Feed table |
| 34 | Conveying element |
| 36 | Sensor |
| 38 | Drive |
| 40 | Conveying arm |
| 42 | Rail |
| 44 | Drive |
| 46 | Support element |

-continued

| | |
|---|---|
| 46a | Support element |
| 48 | Axis of rotation |
| 50 | Carriage |
| 52 | Machine frame |
| 54 | Bias spring |
| 56 | Support surface |
| 58 | Spring |
| 60 | Holding element |
| 60a | Holding element |
| 62 | Auxiliary folding edge |
| 62a | Auxiliary folding edge |
| 64 | Part of strip |
| 66 | Supporting surface |
| 68 | Drive |
| 70 | Run-on surface |
| 72 | Folding element |
| 72a | Folding element |
| 73 | Clamping element |
| 73a | Clamping element |
| 74 | Clamping element |
| 74a | Clamping element |
| 76 | Spring |
| 78 | Opening |
| 80 | Latching pin |
| 82 | Spring |
| 84 | Actuator |
| 86 | Rail |
| 88 | Roll |
| 90 | Compression edge |
| 92 | Clamping surface of 74 |
| 94 | Definitive fold |
| 96 | Folding edge |
| 96a | Folding edge |
| 96b | Folding edge |
| 98 | Clamping surface of 73 |
| 100 | Heating element |
| 102 | Half |
| 104 | Half |
| 106 | Displacement arrow |

What is claimed is:

1. An installation for folding a textile strip length, comprising:
a support element for a strip length to be folded, the support element having a support surface aligned parallel to the strip length and an auxiliary folding edge aligned parallel to a folding edge to be created;
a holding element arranged to co-operate with the support surface of the support element for the strip length;
a bias spring arranged to bias the holding element against the support surface of the support element;
clamping elements having clamping surfaces; and
a non-L-shaped folding element for forming a fold of the strip length between the clamping surfaces of two clamping elements for smoothing and fixing the fold, the clamping surfaces of the clamping elements being aligned substantially co-planar with a plane of the strip length to be folded, the auxiliary folding edge of the support element being assigned a supporting surface aligned substantially perpendicular to the support surface of the support element, the folding element having a compression edge arranged to co-operate with the supporting surface of the auxiliary folding edges so as to grip an end of a part of the strip to be turned over against the supporting surface and to compress the part of the strip against the clamping surface of one of the clamping elements, whereby the folding parts directly contact each other, to form the definitive fold to be produced.

2. The installation as defined in claim 1, wherein the support element together with the holding element that can be biased against the support surface are arranged to be movable into and out of a holding position for a strip length.

3. The installation as defined in claim 2, wherein the folding element has an oblique run-on surface so that during a relative movement between the support element and the folding element the folding element turns over a part of the strip projecting beyond the support surface around the auxiliary folding edge and against the supporting surface.

4. The installation as defined in claim 2, and further comprising a movable latch, the holding element being movable by the support element into an initial position in which the holding element is latched by the movable latch.

5. The installation as defined in claim 2, wherein the holding element is set back with respect to the auxiliary folding edge of the support surface of the support element, and the support surface cooperates by means of the auxiliary folding edge with the clamping element arranged to project beyond the folding element so as to raise the clamping element off the folding element as the support element is moved out.

6. The installation as defined in claim 1, wherein the support element and the folding element are biased against each other.

7. The installation as defined in claim 1, wherein the folding element is configured to form a first one of the clamping elements, and further comprising a spring arranged to bias a second of the clamping elements against the first clamping element, the second clamping element being raisable by the support element.

8. The installation as defined in claim 1, wherein at least one of the clamping elements is provided with a heating element.

9. The installation as defined in claim 1, and further comprising a folding station; a conveying device and an unloading station, the support element and the holding element being arranged in a stationary manner on the folding station, the folding element with the clamping element being arranged on the conveying device, which can be moved from the folding station to the unloading station.

10. The installation as defined in claim 9, wherein the conveying device is a rotating carrier.

11. The installation as defined in claim 9, wherein the conveying device has a plurality of folding elements and clamping elements distributed over its length.

12. The installation as defined in claim 11, wherein the support element, the holding element, the clamping elements and the folding element form a first tool set, and further comprising a second tool set arranged at a distance from the first tool set so as to produce strip lengths with two folds.

13. The installation as defined in claim 12, wherein the second tool set is arranged as a mirror image of the first tool set.

14. The installation as defined in claim 1, and further comprising a delivery device for the strip lengths associated with the support element.

15. The installation as defined in claim 14, wherein the delivery device includes a feed device operative to intermittently feed a continuous strip to a severing device in order to sever strip lengths of a pre-determinable length, and a transfer device operative to feed the strip lengths to the support element at a folding station.

16. The installation as defined in claim 15, wherein the feed device has a conveying element which acts only in a conveying direction and is settable in accordance with the predetermined length of the strip length to be severed.

17. The installation as defined in claim 15, wherein the severing device includes a mechanical cutting device and a thermal cutting device.

18. The installation as defined in claim 1, and further comprising an unloading station having a stacking device operative to stack the folded strip lengths.

19. The installation as defined in claim 18, wherein the stacking device has a magazine into which the folded strip lengths are movable against a displacement resistance and are held.

20. The installation as defined in claim 1, wherein the support element, the holding element, the clamping elements and the folding element are configured to produce strip lengths with an end fold.

21. The installation as defined in claim 1, wherein the support element, the holding element, the clamping elements and the folding element are arranged to produce strip lengths with a center fold.

22. The installation as defined in claim 1, wherein the support element, the holding element, the clamping elements and the folding element are arranged to produce strip lengths with a diagonal fold.

23. An installation for folding a textile strip length, comprising:

a support element for a strip length to be folded, the support element having a support surface aligned parallel to the strip length and an auxiliary folding edge aligned parallel to a folding edge to be created;

a holding element arranged to co-operate with the support surface of the support element for the strip length;

a bias spring arranged to bias the holding element against the support surface of the support element;

clamping elements having clamping surfaces; and a folding element for forming a fold of the strip length between the clamping surfaces of the clamping elements for smoothing and fixing the fold, the clamping surfaces of the clamping elements being aligned substantially co-planar with a plane of the strip length to be folded, the auxiliary folding edge having a supporting surface aligned substantially perpendicular to the support surface of the support element, the folding element having a compression edge arranged to co-operate with the supporting surface of the auxiliary folding edges so as to grip an end of a part of the strip to be turned over against the supporting surface and to compress the part of the strip against the clamping surface of one of the clamping elements to form the definitive fold to be produced, the folding element being configured to form at least one of the clamping elements, and further comprising a spring arranged to bias a second of the clamping elements against the first clamping element, the second clamping element being raisable by the support element.

24. An installation for folding a textile strip length, comprising:

a support element for a strip length to be folded, the support element having a support surface aligned parallel to the strip length and an auxiliary folding edge aligned parallel to a folding edge to be created;

a holding element arranged to co-operate with the support surface of the support element for the strip length;

a bias spring arranged to bias the holding element against the support surface of the support element;

clamping elements having clamping surfaces; and a folding element for forming a fold of the strip length between the clamping surfaces of the clamping elements for smoothing and fixing the fold, the clamping surfaces of the clamping elements being aligned substantially co-planar with a plane of the strip length to be folded, the auxiliary folding edge having a supporting surface aligned substantially perpendicular to the support surface of the support element, the folding element having a compression edge arranged to co-operate with the supporting surface of the auxiliary folding edges so as to grip an end of a part of the strip to be turned over against the supporting surface and to compress the part of the strip against the clamping surface of one of the clamping elements to form the definitive fold to be produced, the support element together with the holding element that can be biased against the support element being arranged to be movable into and out of a holding position for a strip length, and further comprising a movable latch, the holding element being movable by the support element into a holding position in which the holding element is latched by the movable latch.

25. An installation for folding a textile strip length, comprising:

a support element for a strip length to be folded, the support element having a support surface aligned parallel to the strip length and an auxiliary folding edge aligned parallel to a folding edge to be created;

a holding element arranged to co-operate with the support surface of the support element for the strip length;

a bias spring arranged to bias the holding element against the support surface of the support element;

clamping elements having clamping surfaces; and a folding element for forming a fold of the strip length between the clamping surfaces of the clamping elements for smoothing and fixing the fold, the clamping surfaces of the clamping elements being aligned substantially co-planar with a plane of the strip length to be folded, the auxiliary folding edge having a supporting surface aligned substantially perpendicular to the support surface of the support element, the folding element having a compression edge arranged to co-operate with the supporting surface of the auxiliary folding edges so as to grip an end of a part of the strip to be turned over against the supporting surface and to compress the part of the strip against the clamping surface of one of the clamping elements to form the definitive fold to be produced, the support element together with the holding element that can be biased against the support element being arranged to be movable into and out of a holding position for a strip length, the holding element being set back with respect to the auxiliary folding edge of the support surface of the support element, and the support surface cooperating by means of the auxiliary folding edge with the clamping element arranged to project beyond the folding element so as to raise the clamping element off the folding element as the support element is moved out.

* * * * *